United States Patent [19]
Stehlik

[11] 3,882,557
[45] May 13, 1975

[54] RAISED SEAT PLATFORM

[76] Inventor: Richard C. Stehlik, 321 Sheridan Rd., Winnetka, Ill. 60093

[22] Filed: July 2, 1973

[21] Appl. No.: 375,709

Related U.S. Application Data

[63] Continuation of Ser. No. 212,018, Dec. 27, 1971, Pat. No. 3,742,529.

[52] U.S. Cl. .............................. 5/114; 5/94; 5/118
[51] Int. Cl. ........................ A47c 27/08; A47f 1/00
[58] Field of Search ......... 5/94, 110, 111, 112, 114, 5/118, 117; 297/438, 439

[56] References Cited
UNITED STATES PATENTS

| | | | |
|---|---|---|---|
| 1,135,707 | 4/1915 | Mattes | 5/114 |
| 3,045,257 | 7/1962 | Knapp | 5/112 X |
| 3,063,064 | 11/1962 | Mace | 5/94 |
| 3,108,291 | 10/1963 | Eason | 5/111 |
| 3,134,987 | 6/1964 | Berthram | 5/114 |
| 3,327,982 | 6/1967 | Kramer | 5/111 |
| 3,742,529 | 7/1973 | Stehlik | 5/118 |

Primary Examiner—Casmir A. Nunberg

[57] ABSTRACT

A foldable bed is formed from a pair of substantially U-shaped end members joined together by intermediate members and connecting links. A flexible sheeting is secured to the frame formed by the U-shaped members, the intermediate members and the connecting links and provides a support platform for the bed. A pair of swingable legs are provided on one side of the frame. The connecting links are characterized by a pair of cut-outs forming end tabs for connection to the intermediate members and the U-shaped members. One of the cut-outs is of lesser extent than the other whereby end portions of the U-shaped members and the intermediate members may be pivoted about the tabs for folding the bed into a compact condition and, also, for supporting the members when the bed is extended to an open position.

5 Claims, 5 Drawing Figures

3,882,557

RAISED SEAT PLATFORM

This application is a continuation of my copending application Ser. No. 212,018, filed Dec. 27, 1971 now U.S. Pat. No. 3,742,529.

BACKGROUND OF THE INVENTION

This invention relates to a foldable bed and, more particularly, to a platform which may be used temporarily in automobiles and the like and removed therefrom when not in use and stored away; the disclosure therein being incorporated in this specification by reference thereto.

The platform of the present invention may be used as a sleeping bed or a storage platform, and in addition, it may also serve as a play area for young children. The platform is constructed with a single pair of legs attached to one side thereof, the support for the other side of the platform will normally be the rear seat of a vehicle. It is to be understood that if desired the same platform may be utilized with a piece of furniture, such as a sofa, or other suitable support as an extra sleeping area in a home. However, its primary intended use is in cooperation with the rear seat of an automobile.

In recent years there has been a large increase in automobile travel and much of this is probably due to the large number of high speed highways and turnpikes which have been constructed. As a result, it is not uncommon for people to drive extensive distances, often with small children. Normally, those who are not driving try and obtain some rest or sleep during the long trip. However, they often encounter a general discomfort in trying to sleep sitting up or on the narrow back seat of an automobile. It should be noted that it is not only children who often desire to sleep in the rear seat of an automobile during the long trip, but others such as sportsmen and salesmen.

SUMMARY OF THE INVENTION

The present invention provides a simple, inexpensive and yet sturdy foldable bed which may be used with the rear seat of an automobile to provide a suitable sleeping or storage area. It may also be similarly used in a home with a piece of furniture to provide another sleeping area.

Accordingly, it is an object of the present invention to provide such a simple, inexpensive and sturdy foldable bed easily folded and stored away when not in use, and, yet, which may be manufactured from a minimum of parts.

DESCRIPTION OF THE ILLUSTRATED EMBODIMENT

Figure 1:
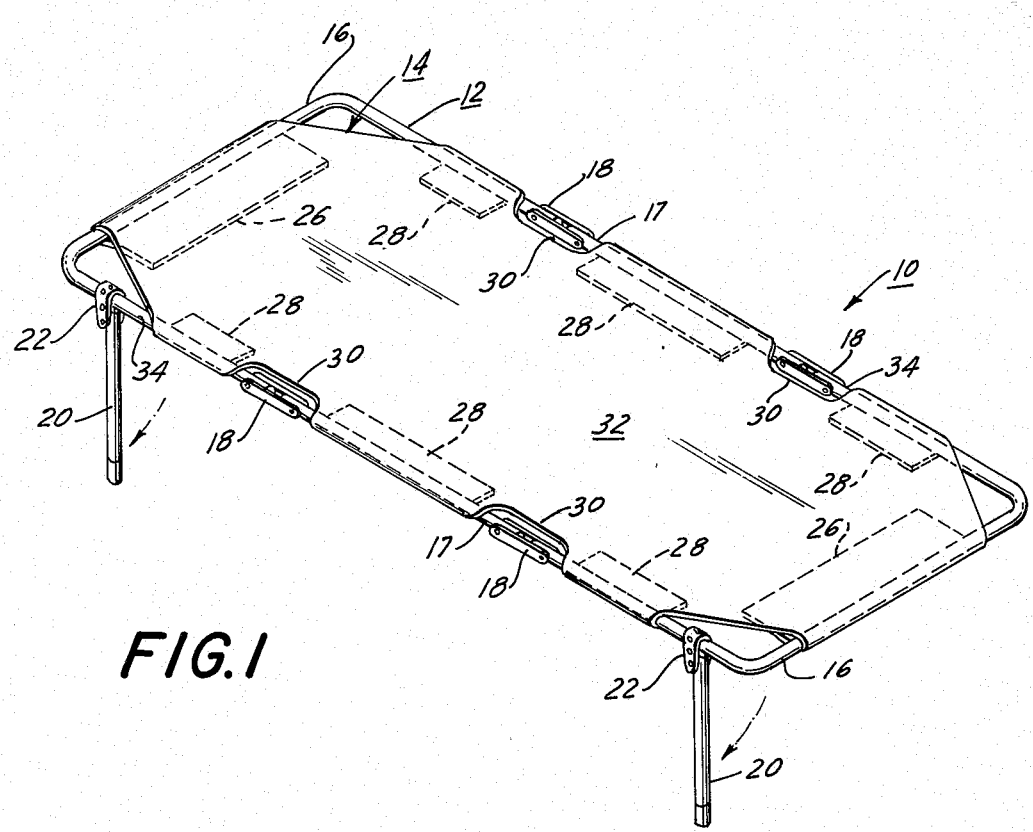
FIG. 1 is a perspective view of the foldable bed of the present invention in an open or use position.

Referring to the drawings, a foldable bed or cot 10 is shown. The bed is normally used in conjunction with a suitable support such as the rear seat 11 of an automobile, although it may also be used with a piece of furniture or a similar structure elsewhere.

The bed 10 comprises a frame 12 to which is attached a covering 14, the covering serving as the platform of the bed. The frame 14 includes a pair of U-shaped end members 16 which are preferably made from a sturdy and lightweight material, such as tubular aluminum, and are connected together by a pair of intermediate members 17 and connecting links 18. To support the frame 12 and covering 14, a pair of legs 20 are connected to the members 16 by means of connectors 22. The connectors 22 are affixed to the legs 20 and moveably connected to the members 16. Spring loaded retention mechanisms 24 hold the legs in a use position or permit them to swing out of the way for storage purposes.

The covering 14 may be of any suitable flexible sheeting material such as woven cloth or plastic webbing. The term "sheeting" as used herein is meant to include any flexible supporting material. The covering 14, in the illustrated embodiment, has end flaps 26 which wrap around the U-shaped frames 16 and are then stitched to the body of the covering so that it is securely affixed to the frame in a longitudinal direction. Side flaps 28 are similarly fastened to the side portions of the members 16 so as to securely support the covering 14 in a transverse direction.

Advantageously, the side flaps 28 are adjacent to the connecting links 18 and cut-out portions 30 in the covering 14. The cut-out portions 30 permit the bed to be folded without interfering with the operations of the links 18. Due to the close positioning of the side flaps 28 to the links 18, the unsupported central portion 32 of the covering 14 is also tautly held even when the bed is folded into a compact condition.

The U-shaped members 16 include a pair of arms 34 which are connected at their end portions 36 to the corresponding end portions 37 of the intermediate members 17 by tabs 38 on one end of the links 18. In turn tabs 38 on the other end of the links 18 are connected to the other ends 39 of the member 17. The end portions are connected to the tabs 38 by suitable pivots 40, such as loose rivets. The tabs 38 are formed by lower cut-outs 42 and upper cut-outs 44 at each end of the links 18, the extent of cut-outs 44 being greater than cut-outs 42.

Figure 5:
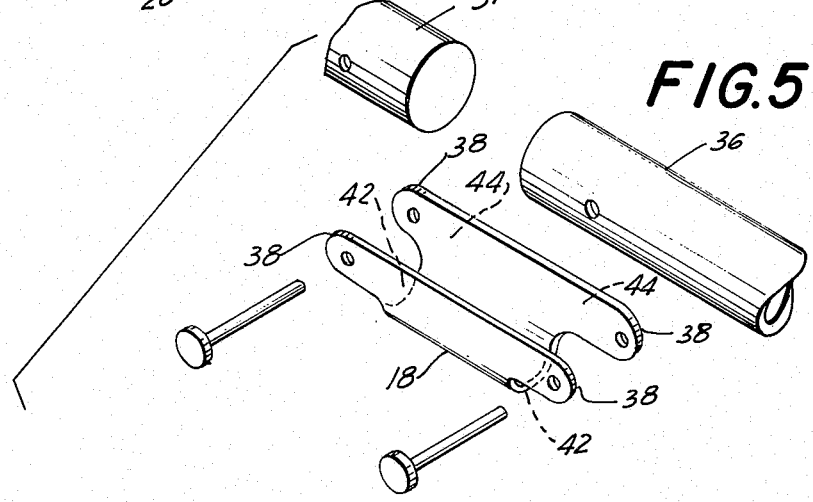
FIG. 5 is an enlarged, partially fragmentary perspective view showing the relationship between the connecting links and the members forming the frame for the bed.

The cut-out 44 is of sufficient extent (in FIG. 5 the entire length of link 18) to permit the end portions to be pivoted at the pivots 40 and swung into engagement with that region of the link 18 adjacent to the lower or lesser cut-out 42. Accordingly, when the bed 10 is in an open position and a load is placed on the covering 14, the end portions 36 of the arms 34 and the intermediate members 17 will be fully supported by the links 18, thus, providing a continuous frame and eliminating the necessity of any additional central support for the bed.

Figure 3:
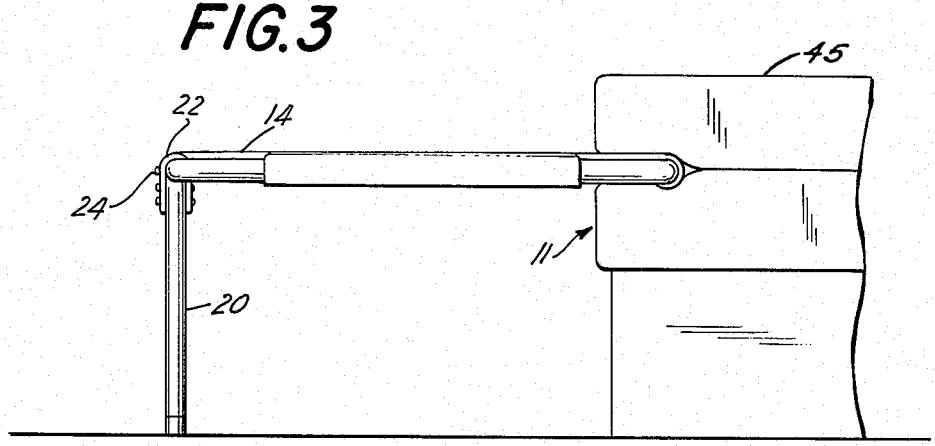
FIG. 3 is an end view of the foldable bed of FIG. 1 showing it in cooperation with the rear seat of an automobile.

Normally, the width of the bed 10 will be sufficient to override the cushion of the seat in the rear of an automobile while abutting the back of the front seat of the automobile. Therefore, the need of rear supports other than the legs 20 is eliminated. If the car bed 10 is used an environment other than an automobile, it may be supported between a pair of cushions, such as the cushion 45 shown in FIG. 3.

Figure 2:
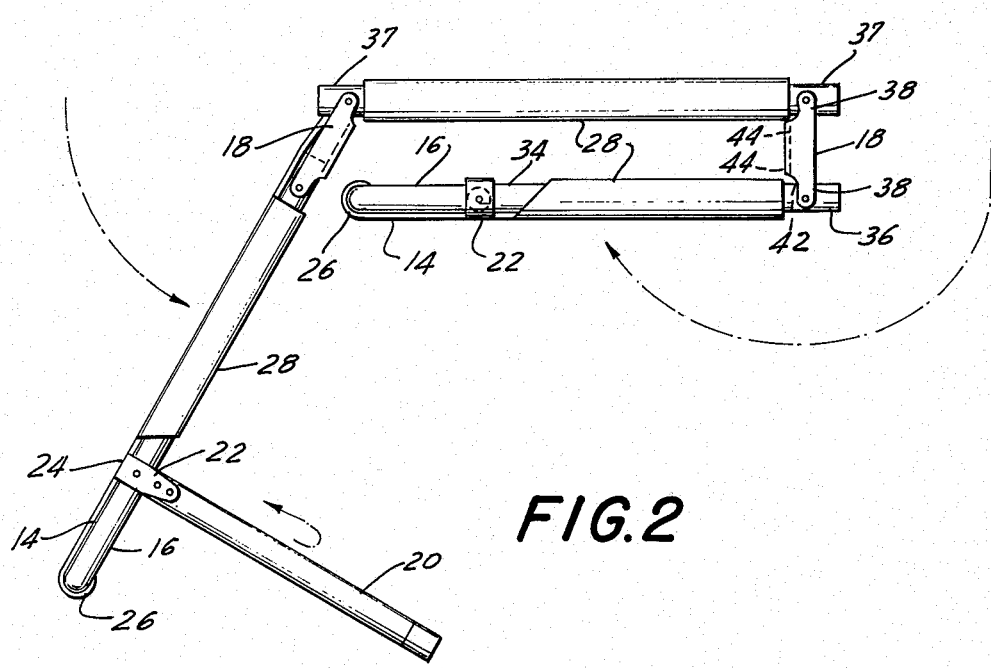
FIG. 2 is a side view of the foldable bed of FIG. 1 showing it in the act of being folded into a substantially U-shaped condition for storage.
Figure 4:
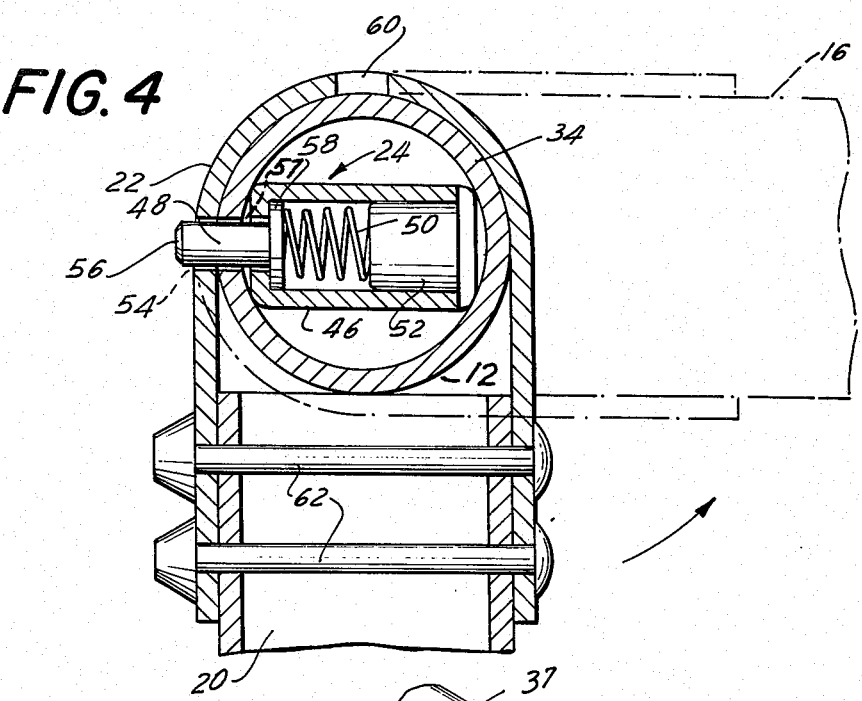
FIG. 4 is an enlarged sectional view showing the retention mechanism for holding a swingable leg in position.

The connectors 22 and the retention mechanisms 24 cooperate to permit the bed to be readily set up for use or rolled up for storage. As shown in FIG. 4 in particular, the retention mechanism includes a housing 46 into which is placed a detent button 48. The button is urged outwardly by a spring 50, with the spring being bottomed against a base 52. An opening 54 is provided in the connector 22 and a stub 56 of the detent button 48 fits through that opening as well as an opening 57 in the frame 12. A flange portion 58 of button 48 holds it within the housing. When stub 56 is engaged in the connector opening 54 the leg 20 is held securely in an in-use position with reference to the covering 14. Merely by pushing the button inwardly the leg 20 can be swung to a storage position as shown in FIG. 2, where the stub 56 engages a second opening 60.

With the legs 20 swung out of the in-use position the bed may readily be rolled up into a three-fold condition for storage.

The connector 22 has not been described in great detail since it may be of any desired shape. In the illustrated embodiment, as particularly shown in FIG. 4, a satisfactory connector is one formed from strap metal such as aluminum and secured to the leg 20 by rivets 62.

As a further convenience a pair of detachable legs may be connected to the side of the bed opposite legs 20. By this means the bed may be used without a side support seat.

The frame components are preferably made of tubular aluminum for lightness and strength. However, if desired they may be made of a substitute such as another metal or plastic.

While the above description has been made in relation to the illustrated embodiment, it is to be understood that other constructions may be utilized which will be obvious to those skilled in the art but in accordance with the appended claims.

What is claimed is:

1. A foldable bed having a support platform area and adapted to be used with a raised seat, said bed comprising:
   a substantially rectangular shaped frame including
   a. a pair of substantially U-shaped end members,
   b. a pair of intermediate members, and
   c. two pairs of links pivotally connecting said end members and intermediate members together;
   a flexible sheeting securely attached to said frame and forming the support platform;
   a pair of swingable leg supports each connected to one side of the frame and adapted to cooperate with the raised seat to support the frame and flexible covering;
   said connecting links having a pair of tab members at each end thereof pivotally connected to end portions of the end members and the intermediate members;
   said tab members being formed by cut-out portions on opposite sides of said links, one cut-out being of lesser extent than the other whereby the end portions of the end members may be pivoted about the tabs and through the greater cut-outs for folding the bed into a compact condition and also for supporting the end members and the intermediate members by the portions of the links adjacent the lesser cut-outs when the bed is extended into an open position for engagement with the seat.

2. A foldable bed as defined in claim 1 wherein the end members, intermediate members and the connecting links are formed from tubular metal material.

3. A foldable bed as defined in claim 2 wherein the end portions of the end members and the intermediate members are of a lesser cross-sectional extent than the distance between adjacent tab members and moveable in between.

4. A foldable bed as defined in claim 1 wherein the flexible sheeting is tautly attached to the support platform by means of securing means about the end members, the intermediate members and adjacent to the links whereby the portion of the sheeting between said links remains taut under a load or when the bed is folded.

5. A foldable bed as defined in claim 1, wherein the swingable leg supports are connected to the frame by means of a connector and a spring loaded retention mechanism, said connector including a strap portion wrapped about the frame and connected to the leg support, the spring loaded retention mechanism including a stub portion adapted to be spring forced into holding engagement with an opening in the connector and an opening in the frame, whereby the leg supports are held in an in-use position.

* * * * *